United States Patent [19]

Bhattacharya

[11] Patent Number: 5,789,348
[45] Date of Patent: *Aug. 4, 1998

[54] PREPARATION OF SUPERCONDUCTOR PRECURSOR POWDERS

[75] Inventor: Raghunath Bhattacharya, Littleton, Colo.

[73] Assignee: Midwest Research Institute, Kansas City, Mich.

[*] Notice: The term of this patent shall not extend beyond the expiration date of Pat. No. 5,413,987.

[21] Appl. No.: 338,910

[22] Filed: Nov. 14, 1994

Related U.S. Application Data

[63] Continuation-in-part of Ser. No. 185,058, Jan. 24, 1994, Pat. No. 5,413,987.

[51] Int. Cl.$^6$ ............................................. C25D 1/00
[52] U.S. Cl. ...................... 505/492; 205/51; 205/74; 505/490; 505/510; 505/739
[58] Field of Search ............. 205/51, 74; 505/510, 505/725, 739, 778, 492, 490

[56] References Cited

U.S. PATENT DOCUMENTS

| | | | |
|---|---|---|---|
| 3,607,675 | 9/1971 | Haines | 427/132 |
| 3,661,726 | 5/1972 | Denes | 205/74 |
| 3,836,436 | 9/1974 | Rivola et al. | 205/74 |
| 3,843,491 | 10/1974 | Piro et al. | 205/74 |
| 3,994,785 | 11/1976 | Rippere | 205/74 |
| 4,046,643 | 9/1977 | Rippere | 205/74 X |
| 4,870,051 | 9/1989 | Maxfield et al. | 505/1 |
| 4,879,270 | 11/1989 | Maxfield et al. | 505/410 |
| 4,882,014 | 11/1989 | Coyle et al. | 205/74 X |
| 4,939,308 | 7/1990 | Maxfield et al. | 505/434 |
| 4,952,557 | 8/1990 | Schmidt | 505/446 |
| 4,957,901 | 9/1990 | Jacobson et al. | 505/1 |
| 4,975,417 | 12/1990 | Koura | 505/472 |
| 5,081,102 | 1/1992 | Gay et al. | 505/510 |
| 5,100,866 | 3/1992 | Itozaki et al. | 505/1 |
| 5,120,707 | 6/1992 | Maxfield et al. | 505/325 |
| 5,137,867 | 8/1992 | Ray et al. | 505/1 |
| 5,162,295 | 11/1992 | Behi et al. | 505/472 |
| 5,210,069 | 5/1993 | Chiang et al. | 505/440 |
| 5,223,480 | 6/1993 | Agarwala et al. | 505/441 |
| 5,244,875 | 9/1993 | Hauser et al. | 505/433 |
| 5,370,784 | 12/1994 | Kammel et al. | 205/74 |

OTHER PUBLICATIONS

John DaLuca et al, "The preparation of '1223' Tl–Ca–Ba–Cu–oxide superconducting films . . . ", *Physica C*, 205 (1993), pp. 21–31, no month available.

*Primary Examiner*—Kathryn Gorgos
*Assistant Examiner*—William T. Leader
*Attorney, Agent, or Firm*—Edna M. O'Connor

[57] ABSTRACT

A process for the preparation of a precursor metallic powder composition for use in the subsequent formation of a superconductor. The process comprises the steps of providing an electrodeposition bath comprising an electrolyte medium and a cathode substrate electrode, and providing to the bath one or more soluble salts of one or more respective metals which are capable of exhibiting superconductor properties upon subsequent appropriate treatment. The bath is continually energized to cause the metallic and/or reduced particles formed at the electrode to drop as a powder from the electrode into the bath, and this powder, which is a precursor powder for superconductor production, is recovered from the bath for subsequent treatment. The process permits direct inclusion of all metals in the preparation of the precursor powder, and yields an amorphous product mixed on an atomic scale to thereby impart inherent high reactivity. Superconductors which can be formed from the precursor powder include pellet and powder-in-tube products.

22 Claims, 7 Drawing Sheets

PREPARATION OF SUPERCONDUCTOR PRECURSOR POWDERS

This application is a continuation-in-part of U.S. patent application Ser. No. 08/185,058, filed Jan. 24, 1994, now U.S. Pat. No. 5,413,987.

The United States Government has rights in this invention under Contract No. DE AC36-83CH10093 between the United States Department of Energy and the National Renewable Energy Laboratory, a division of the Midwest Research Institute.

BACKGROUND OF THE INVENTION

1. Field of the Invention

The present invention relates to an electrodeposition process for the preparation of precursor superconductor powders for subsequent use in the formation of superconductors.

2. Description of the Prior Art

The preparation of superconductor compositions requires the formation and treatment of complex metal oxides wherein the constituents therein are in an appropriate combination for superconducting properties. One example of such a metal oxide is thallium-barium-calcium-copper oxide (TBCCO), a high-temperature superconductor compound. Various methods have been taught for the preparation of superconductors. One such general methodology for preparing superconducting ceramics comprises the electrochemical deposition of a mixture of appropriate metals on a substrate, followed by oxidation of the deposited mixture into the superconducting ceramic. A related method comprises the sequential electrodeposition of layers of appropriate metals on a substrate, followed by oxidation of the deposited layers. Another approach involves suspending, dispersing or dissolving superconductor precursor components within a liquid medium, followed by electrodeposition on a substrate and subsequent oxidation of the entire mass. The preparation of components for such introduction into a liquid medium include a sol-gel process for producing precursor powders; a pyrolytic spray process wherein an atomized spray of metal nitrates is directed into a calcination zone for water vaporization and simultaneous conversion of the nitrates to oxide powders; a chemical co-precipitation process from multiple-salt solutions to produce a metallic powder; and a mechanical process wherein a superconductor material is subjected to manual grinding to thereby produce a powder.

While the effectiveness of employing a powder of superconductor precursor components for subsequent treatment is obviously recognized, the methodologies for preparing such powders are traditional and somewhat burdensome practices. Further, these prior art methods generally produce only a physical mixture of components rather than an amorphous product. Thus, mixing on an atomic scale is not achieved in the prior art.

It is therefore apparent that a need is present for an effective method of producing a precursor powder for subsequent treatment and conversion into a superconductor material. Accordingly, a primary object of the present invention is to provide a process for the production of a superconductor precursor powder employing a chemical electrodeposition of salts of metals capable of exhibiting superconductor characteristics, and thereafter recovering deposited compositions as a precursor powder.

Another object of the present invention is to provide a process for the production of a superconductor precursor powder employing metals capable of yielding a high temperature superconductor upon subsequent treatment.

Yet another object of the present invention is to provide a process for the production of a superconductor precursor powder from salts metals thereof with and without the inclusion of a salt of silver.

Still another object of the present invention is to provide a process for the production of a superconductor precursor powder from salts of metals thereof wherein a solvent employed during electrodeposition of such metals is an aprotic liquid with and without the inclusion of water.

These and other objects of the present invention will become apparent throughout the description of the invention which now follows.

SUMMARY OF THE INVENTION

The present invention is a process for the preparation of precursor metallic powder compositions for use in the subsequent formation of superconductors. The process comprises the sequential steps of, first of all, providing an electrodeposition bath comprising an electrolyte medium and a cathode substrate electrode, and providing to the bath one or more soluble salts of one or more respective metals which are capable of exhibiting superconductor properties upon subsequent appropriate treatment. Second, the bath is electrically energized to thereby direct ions of each respective metal in the bath to the substrate electrode and consequently form metallic and/or reduced particles at the electrode. The bath is continually energized to cause the particles formed at the electrode to drop as a powder from the electrode into the bath, and, finally, this powder, which is a precursor powder for superconductor production, is recovered from the bath.

Precursor powders that can be prepared according to the present invention include, but are not limited to, systems represented by the formula Bi—Sr—Ca—Cu—O; Y—Ba—Cu—O; Tl—Ba—$M_1$—Cu—O, wherein $M_1$ is one or more of Ca and X; Tl—$M_2$—Cu—O, wherein $M_2$ is one or more of Ba, Ca and X; Tl—$M_3$—O, wherein $M_3$ is one or more of Cu, Ca and X; Ba—$M_4$—Cu—O, wherein $M_4$ is one or more of Ca, Tl and X; Ba—$M_5$—O, wherein $M_5$ is one or more of Cu, Ca, Tl and X; Ca—$M_6$—Cu—O, wherein $M_6$ is one or more of Tl, Ba and X; and Ca—$M_7$—O, wherein $M_7$ is one or more of Cu, Tl, Ba and X; wherein X is one or more of Bi, Pb, Ag, Sr, Hg, La, Y, Sm, Eu, Gd, Tb, Dy, Ho, Fr, Tm, Yb, Lu, and S.

The inventive process here described permits direct inclusion of all metals in the preparation of the precursor powder, and yields an amorphous product mixed on an atomic scale to thereby impart inherent high reactivity. The powders produced according to the present process can be used in a wide range of applications in the production of superconductors, including pellet and powder-in-tube products.

DETAILED DESCRIPTION OF PREFERRED EMBODIMENTS

The preferred embodiments of the present invention as described in the following Examples illustrate a process for the preparation of superconductor precursor powders for ultimate production of superconductors.

Example I (TBCCO)

An electrodeposition bath containing hydrated metal nitrates dissolved in dimethylsulfoxide (DMSO—an aprotic electrolyte medium), a cathode silver substrate electrode, a platinum gauze counter electrode and a silver pseudoelectrode is prepared. To prepare the DMSO-nitrates solution initially, 0.028M thallium nitrate, 0.354M barium nitrate, 0.192M calcium nitrate, and 0.058M copper nitrate are added to the DMSO. The bath is energized for a period of one to four hours to thereby direct ions of each metal in the bath to the cathode substrate electrode and cause formation of metallic particles at that electrode. After the first few microns of electrodeposited film adheres to the cathode substrate electrode, the remainder of the deposited particles peels off of the electrode and accumulates as a powder at the bottom of the bath. This powder is recovered by draining the DMSO from the bath, cleaning the powder in DMSO, methanol and/or toluene, and drying it on a hot plate in open air at about 100° C.

It has been found that a deposition rate of $\approx 10$ µm/minute ($\approx 0.15$ g TBCCO on a 20 cm² substrate) TBCCO using $\approx 0.63$M total solution concentration produces desired results. The respective deposition rate of each of the elements in the combination under constant potential at steady state conditions can be represented by the equation $d[M^0]/dt = k_m[M^{n+}]$, where $k_m$ is the potential-dependent rate constant and $[M^{n+}]$ is the electrolyte-solution concentration of the metal ion. To produce 10 to 30 grams TBCCO precursor powder, about 10 hours of electrodeposition time is required.

Figure 1:
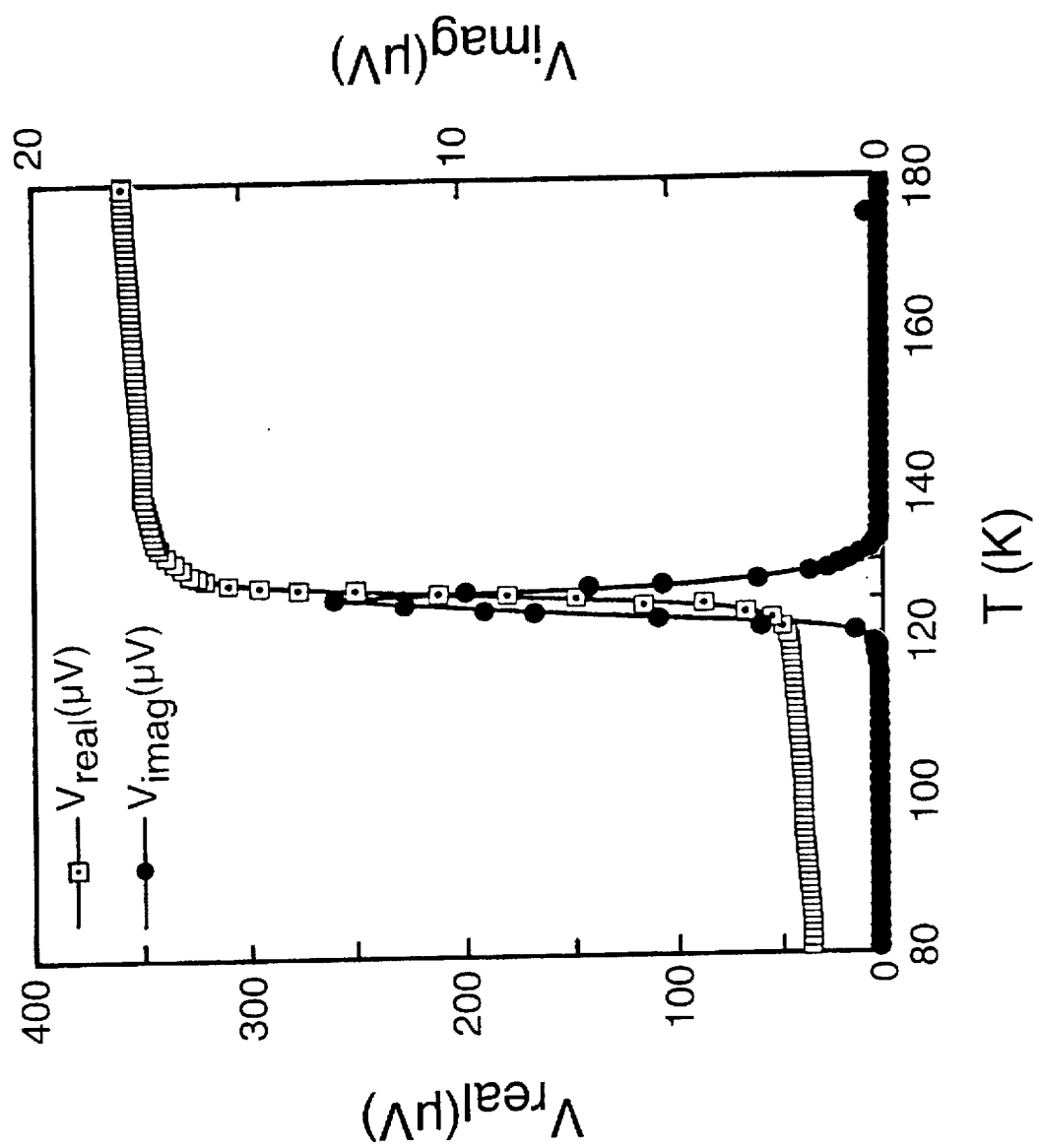
FIG. 1 is a graph showing mutual inductance measurement of a TBCCO pellet formed as a product of the present invention.
Figure 2:
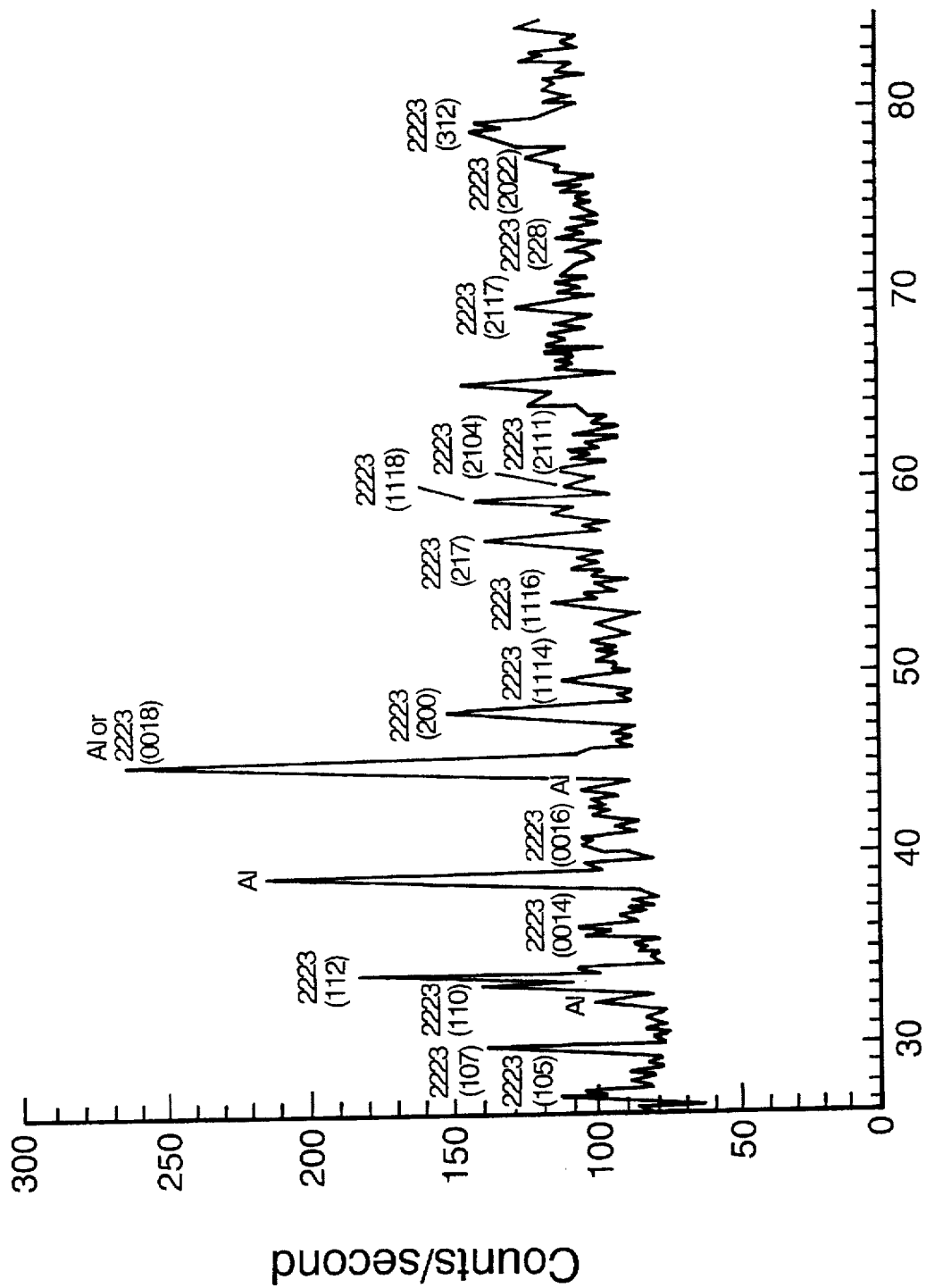
FIG. 2 is a structural x-ray analysis of the TBCCO pellet.
Figure 3:
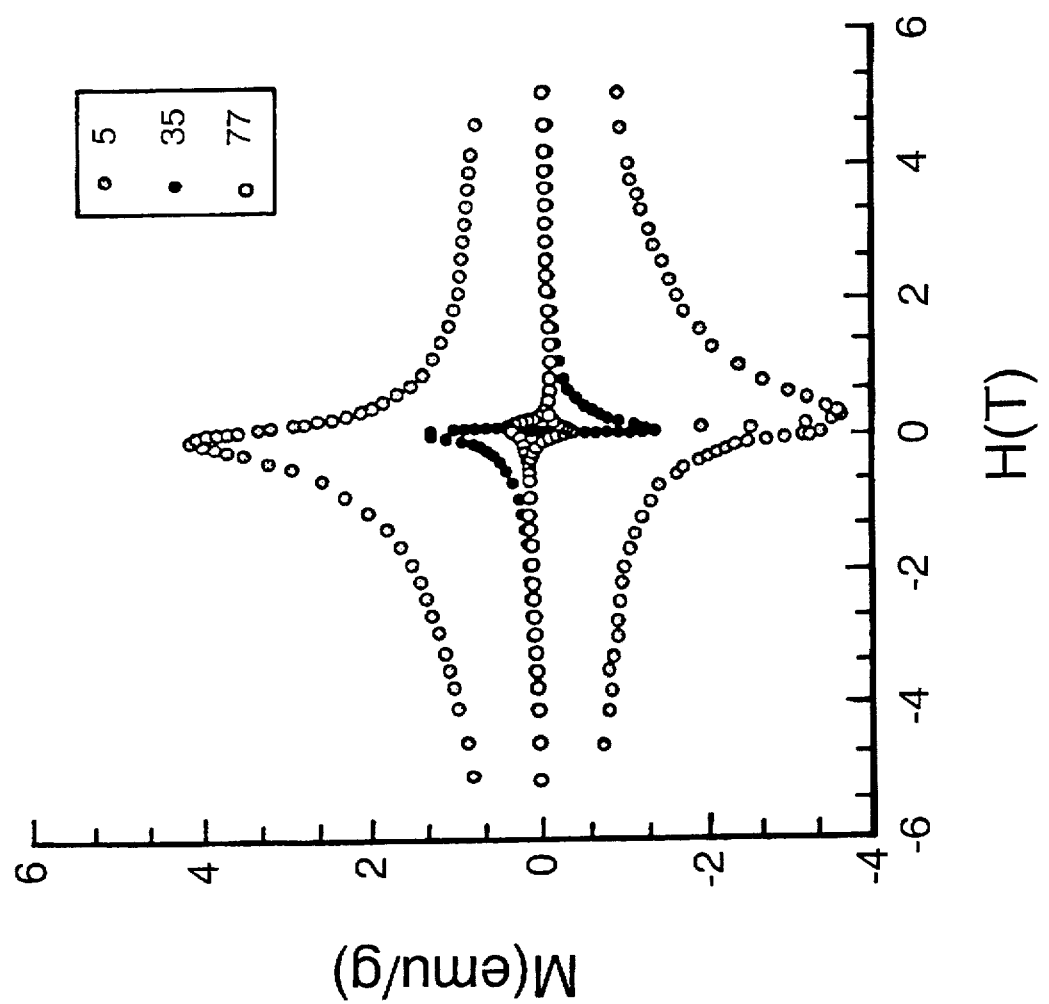
FIG. 3 is a graph showing magnetization measurements of the TBCCO pellet.

After drying the powder as described above, it is pressed into individual pellets under about three tons of pressure and thereafter reacted at about 835° C. to 880° C. for about 30 minutes to five hours in flowing oxygen. To confirm the presence of superconductor properties in such a pellet, a mutual inductance measurement, shown in FIG. 1, is performed on a pellet produced as described. The pellet shows an onset temperature of 125K ($T_{zero}$=122K), and an x-ray analysis, shown in FIG. 2, confirms a thallium-2223 structure as the major phase development. Magnetization measurements, shown in FIG. 3, demonstrate a magnetization loop [M v H(T)] which is open at 5K up to 6 T, is nearly closed at 35K at 3 T, and is substantially closed at 77K at 1 T.

Example II (TBCCAgO)

Figure 4:
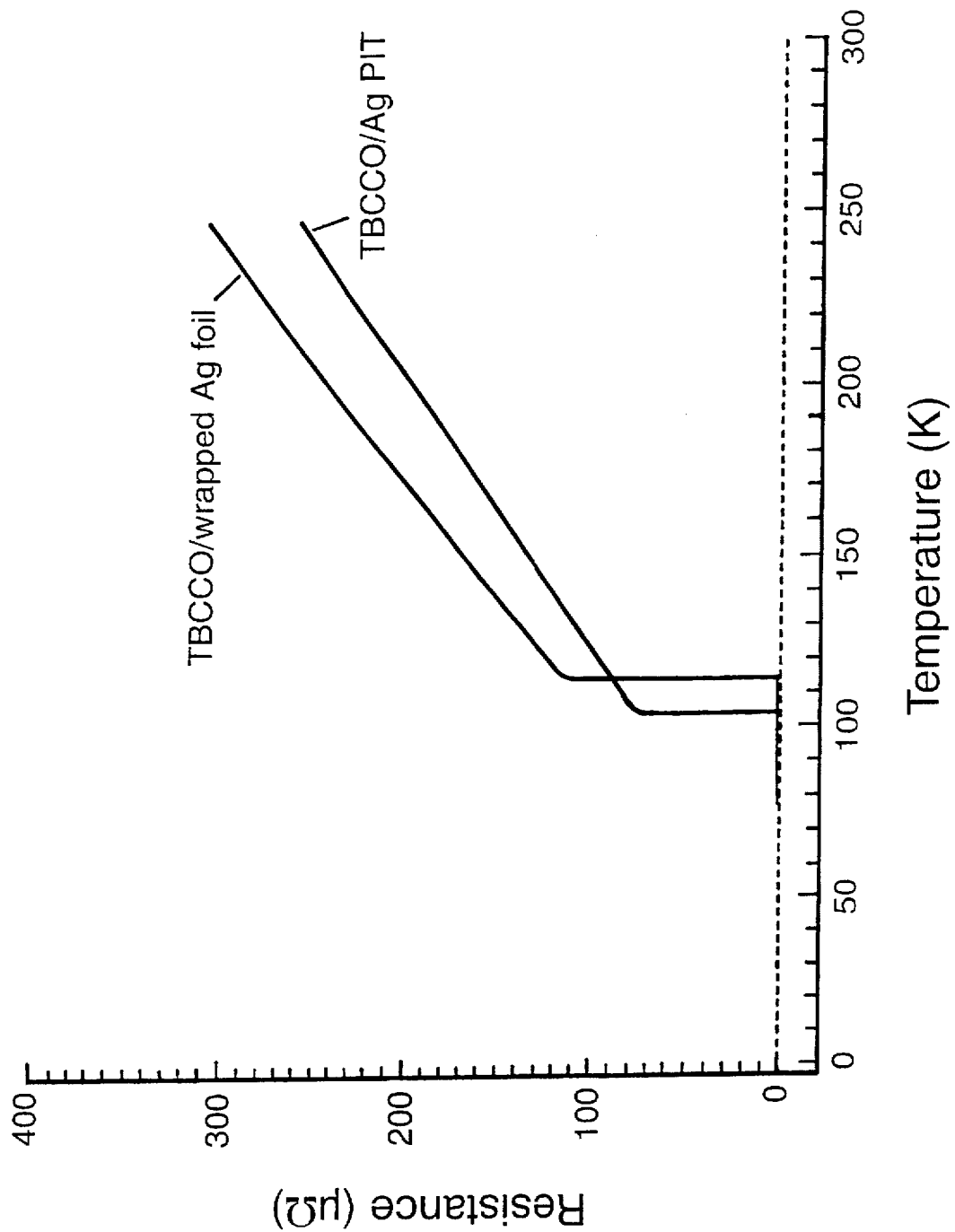
FIG. 4 is a graph showing resistance onset v. temperature of two TBCCO powder-in-tube products formed according to the present invention.
Figure 5:
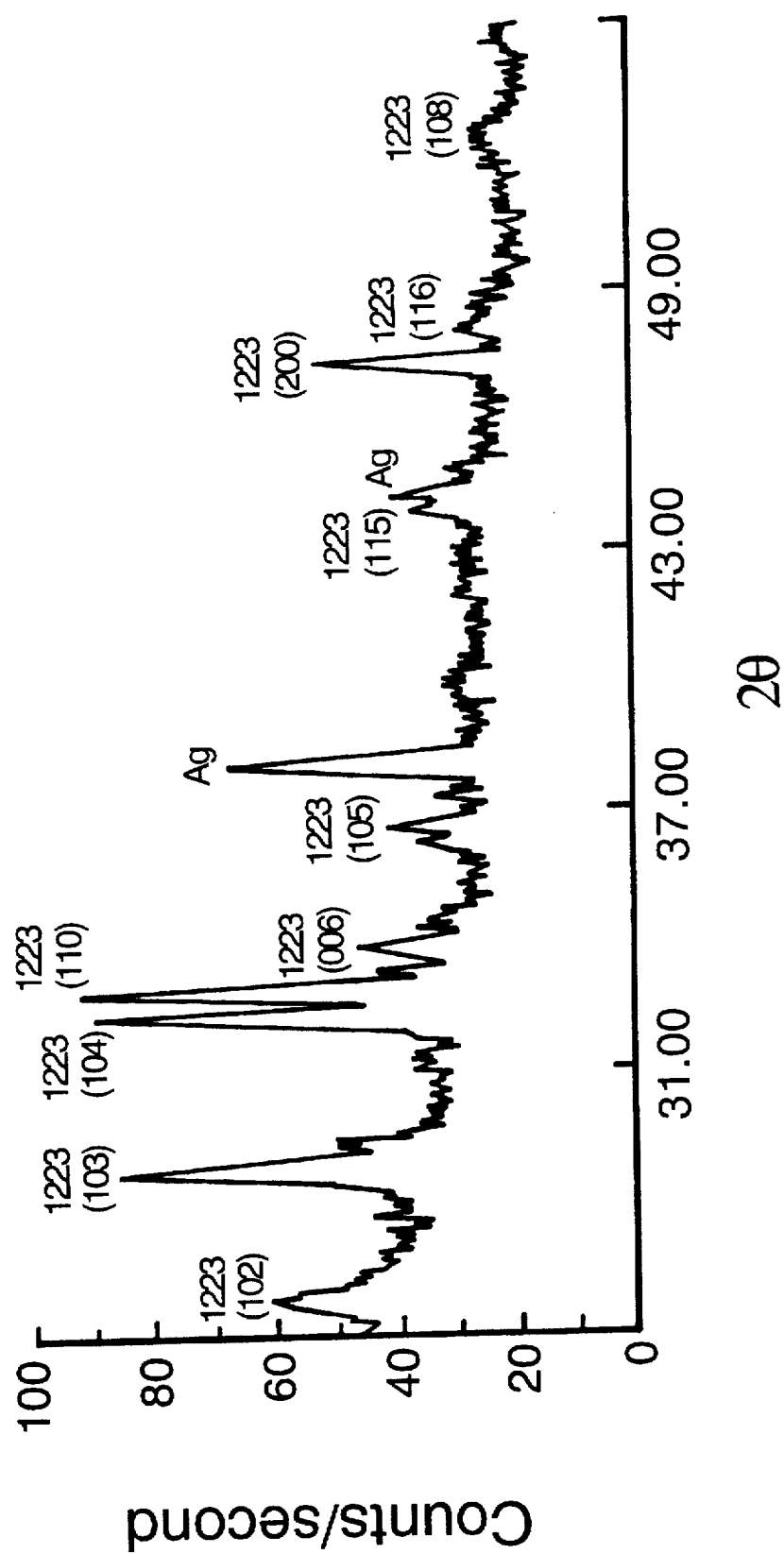
FIG. 5 is a structural x-ray analysis of a powder-in-tube product.

In the same manner as in Example I, an electrodeposition bath is prepared with the nitrates of thallium, barium, calcium and copper. In addition, 0.0074M of silver nitrate is added to the DMSO, and the bath is energized for a like period as in Example I. The resultant TBCCO precursor powder doped with silver is recovered in the same manner as in Example I and is formed into powder-in-tube (PIT) rolled tape. Such PIT formation is accomplished by first pre-reacting the powder at about 835° C. to about 880° C. for about one to five hours in flowing oxygen. Because some thallium oxide is lost during this pre-reacting procedure, a replacement amount of thallium oxide is added to the pre-reacted precursor powder. The amount of thallium oxide loss is dependent on the length of pre-reacting time. Thus, the amount of replacement thallium oxide which is added is equal to an amount necessary to maintain the desired ratio among the thallium, barium, calcium and copper of the composition, as recognized by the skilled artisan. Simultaneously, if desired, but not here exemplified, bismuth oxide, lead oxide and/or strontium oxide also can be added. Thereafter, the powder is allowed to cool, and then is loaded into a silver tube and reacted at a temperature between about 825° C. to 845° C. for about five hours. During this approximately five-hour period (which can range from about four to eight hours), the temperature can be varied between 825° C. and 845° C. As shown in FIG. 4, the resulting PIT shows an onset temperature of 103K ($T_{zero}$=100K), and an x-ray analysis, shown in FIG. 5, confirms a thallium 1223 structure as the major phase development. Four probe transport measurements show the critical current density $J_c$ in zero magnetic field of $10^4$ A/cm² at 76K ($I_c \approx 6$ A).

Example III (TBCCO)

In the same manner as in Example I, an electrodeposition bath is prepared with the nitrates of thallium, barium, calcium and copper, and the bath is energized for a like period of time. The resultant TBCCO precursor powder is recovered in the same manner as in Example I and formed into powder-in-tube (PIT) rolled tape. Such PIT formation is accomplished in the same manner as described in Example II. As shown in FIG. 4, the resulting PIT shows an onset temperature of 117K ($T_{zero}$=114K), and an x-ray analysis confirms a thallium 1223 structure as the major phase development. Four probe transport measurements likewise show the critical current density $J_c$ in zero magnetic field of $10^4$ A/cm² at 76K ($I_c \approx 6$ A).

While Examples II and III include thallium nitrate in the electrodeposition bath, it is acceptable to prepare a bath containing nitrates of barium, calcium and copper (with or without a silver nitrate), and thereafter prepare a barium-calcium-copper oxide (BCCO) (with or without silver) as described in Example I. The BCCO is pre-reacted at about 835° C. to about 880° C. for about one to five hours in flowing oxygen as described in Example II, after which thallium oxide is introduced in an amount sufficient to provide the ratio thereof as earlier described. Thereafter, the powder is allowed to cool, and then is loaded into a silver tube and reacted at a temperature between about 825° C. to 845° C. for about five hours, all as described in Example II.

Example IV (a) & (b) (YBaCuO)

In the same manner as in Example I, 7.666 gm $Y(NO_3)_3 \cdot 6H_2O$, 10.427 gm $Ba(NO_3)_2$ and 5.915 gm $Cu(NO_3)_2 \cdot 6H_2O$ were dissolved in 300 ml DMSO solution. A first YBaCuO powder was prepared at −4 V, and a second powder was prepared at −5 V (vs. Ag pseudo reference electrode). The process was repeated except with the addition of 30 ml water to the DMSO. Again, a first powder was prepared at −4 V, and a second powder was prepared at −5 V (vs. Ag pseudo reference electrode).

Example V (a) & (b) (BaCaCuAgO)

In the same manner as in Example I, 7.706 gm $Ba(NO_3)_3$, 3.543 gm $Ca(NO_3)_2 \cdot 4H_2O$, 3.558 gm $Cu(NO_3)_2 \cdot 6H_2O$ and 0.204 gm $AgNO_3$ were dissolved in 390 ml DMSO. A first BaCaCuAgO powder was prepared at −4 V, and a second powder was prepared at −5 V (vs. Ag pseudo reference electrode). The process was repeated except with the addition of 30 ml water to the DMSO. Again, a first powder was prepared at −4 V, and a second powder was prepared at −5 V (vs. Ag pseudo reference electrode).

Example VI (a) & (b) (BaCaCuO)

In the same manner as in Example I, 7.706 gm $Ba(NO_3)_3$, 3.567 gm $Ca(NO_3)_2 \cdot 4H_2O$ and 3.555 gm $Cu(NO_3)_2 \cdot 6H_2O$ were dissolved in 200 ml DMSO. A first BaCaCuO powder was prepared at −4 V, and a second powder was prepared at −5 V (vs. Ag pseudo reference electrode). The process was repeated except with the addition of 30 ml water to the DMSO. Again, a first powder was prepared at −4 V, and a second powder was prepared at −5 V (vs. Ag pseudo reference electrode).

Example VII (a) & (b) (BaCaCuBiSrPbO)

In the same manner as in Example I, 7.706 gm $Ba(NO_3)_3$, 3.974 gm $Ca(NO_3)_2 \cdot 4H_2O$, 3.552 gm $Cu(NO_3)_2 \cdot 6H_2O$, 0.882 gm $Bi(NO_3)_3 \cdot 5H_2O$, 1.015 gm $Sr(NO_3)_2$ and 1.158 gm $Pb(NO_3)_2$ were dissolved in 300 ml DMSO. A first BaCaCuBiSrPbO powder was prepared at −4 V, and a second powder was prepared at −5 V (vs. Ag pseudo reference electrode). The process was repeated except with the addition of 30 ml water to the DMSO. Again, a first powder was prepared at −4 V, and a second powder was prepared at −5 V (vs. Ag pseudo reference electrode).

Example VIII (a) & (b) (PbBiSrCaCuO)

In the same manner as in Example I, 1.423 gm $Pb(NO_3)_2$, 1.957 gm $Bi(NO_3)_3 \cdot 5H_2O$, 9.870 gm $Sr(NO_3)_2$, 5.037 gm $Ca(NO_3)_2 \cdot 4H_2O$ and 4.054 gm $Cu(NO_3)_2 \cdot 6H_2O$ were dissolved in 300 ml DMSO. A first PbBiSrCaCuO powder was prepared at −4 V, and a second powder was prepared at −5 V (vs. Ag pseudo reference electrode). The process was repeated except with the addition of 30 ml water to the DMSO. Again, a first powder was prepared at −4 V, and a second powder was prepared at −5 V (vs. Ag pseudo reference electrode).

Example IX (a) & (b) (BiSrCaCuO)

In the same manner as in Example I, 2.212 gm $Bi(NO_3)_3 \cdot 5H_2O$, 11.608 gm $Sr(NO_3)_2$, 5.595 gm $Ca(NO_3)_2 \cdot 4H_2O$ and 4.094 gm $Cu(NO_3)_2 \cdot 6H_2O$ were dissolved in 300 ml DMSO. A first BiSrCaCuO powder was prepared at −4 V, and a second powder was prepared at −5 V (vs. Ag pseudo reference electrode). The process was repeated except with the addition of 30 ml water to the DMSO. Again, a first powder was prepared at −4 V, and a second powder was prepared at −5 V (vs. Ag pseudo reference electrode).

Example X (a) & (b) (TlBiSrBaCaCuAgO)

In the same manner as in Example I, 2.027 gm $TlNO_3$, 2.000 gm $Bi(NO_3)_3 \cdot 5H_2O$, 14.206 gm $Sr(NO_3)_2$, 9.413 gm $Ba(NO_3)_3$, 6.217 gm $Ca(NO_3)_2 \cdot 4H_2O$, 5.061 gm $Cu(NO_3)_2 \cdot 6H_2O$ and 0.204 $AgNO_3$ were dissolved in 300 ml DMSO. A first TlBiSrBaCaCuAgO powder was prepared at −4 V, and a second powder was prepared at −5 V (vs. Ag pseudo reference electrode). The process was repeated except with the addition of 30 ml water to the DMSO. Again, a first powder was prepared at −4 V, and a second powder was prepared at −5 V (vs. Ag pseudo reference electrode).

Example XI (YBaCuO)

Figure 6:
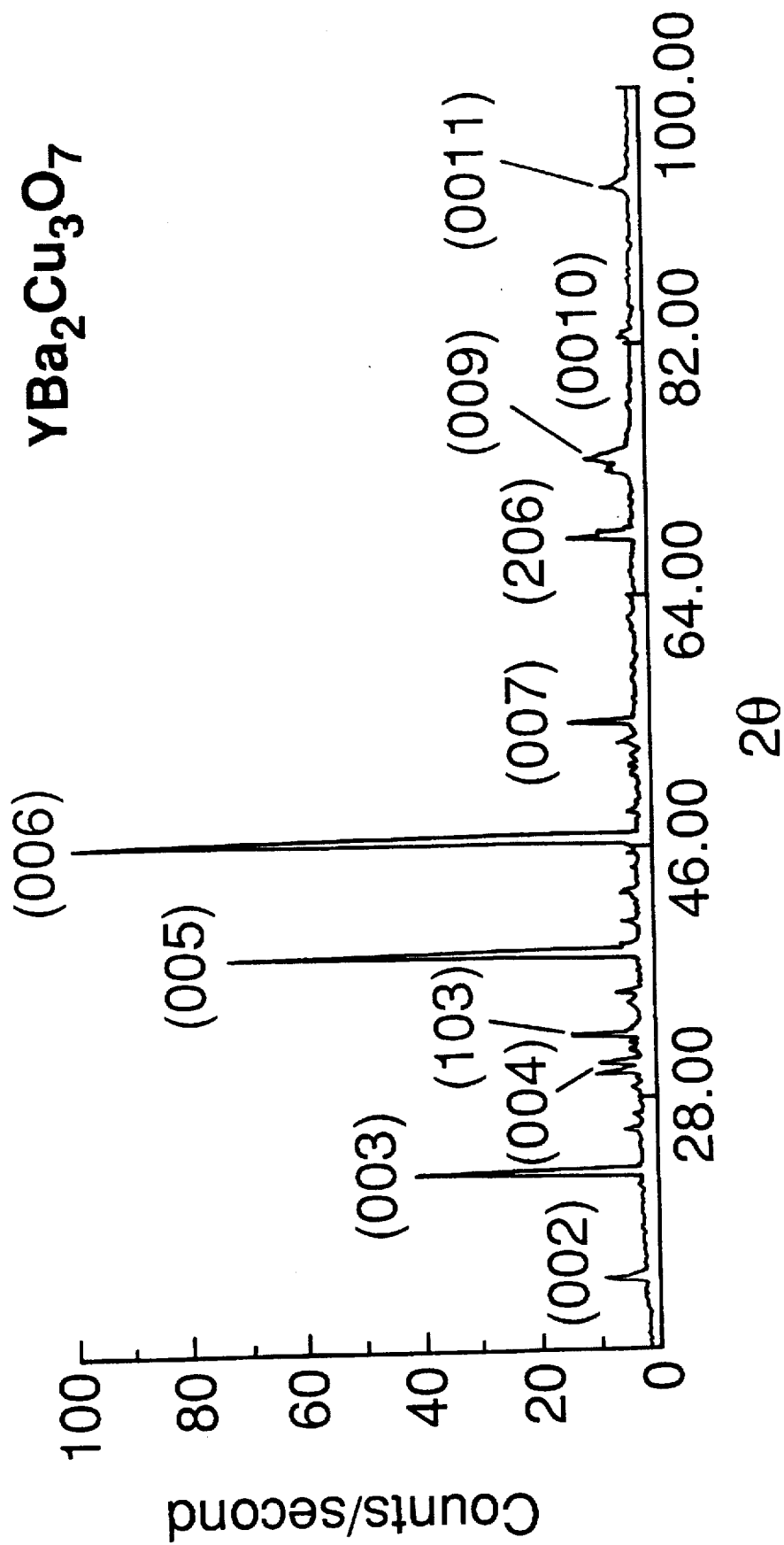
FIG. 6 is an x-ray analysis of a pellet showing superconducting $YBa_2Cu_3O_7$ (123 phase) formation.

In the same manner as in Example I, 7.666 gm $Y(NO_3)_3 \cdot 6H_2O$, 10.427 gm $Ba(NO_3)_2$ and 5.915 gm $Cu(NO_3)_2 \cdot 6H_2O$ were dissolved in 300 ml DMSO solution. A first YBaCuO powder was prepared at −2.5 V, and a second powder was prepared at −4 V (vs. Ag pseudo reference electrode). Each of the powders was annealed in the range of 900°–1,050° C. for 5 minutes to 2 hours. FIG. 6 shows the superconducting $YBa_2Cu_3O_7$ 123 phase formation. The resistive transition shows a zero temperature of 90K.

Example XII (PbBiSrCaCuO)

Figure 7:
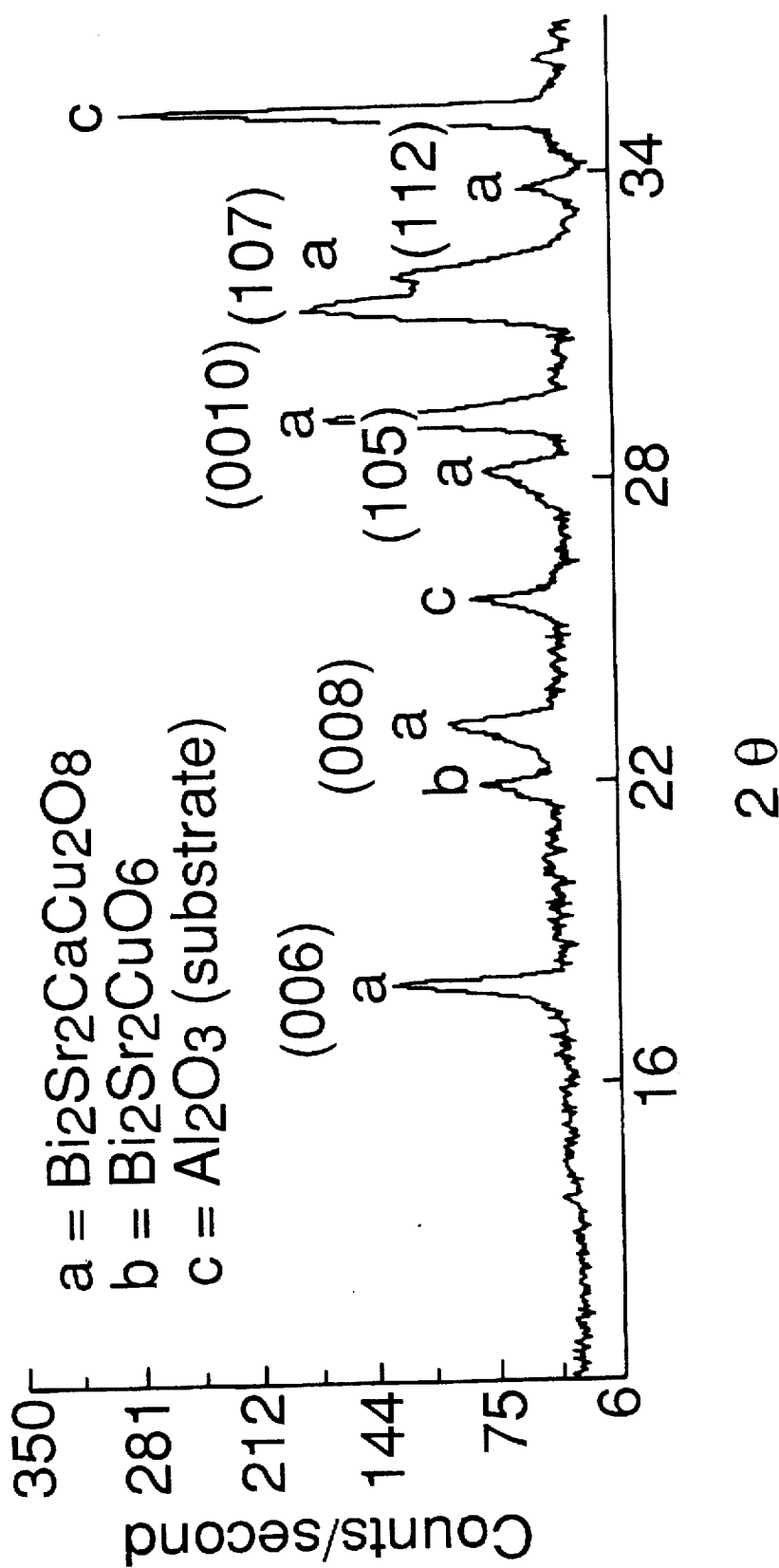
FIG. 7 is an x-ray analysis of a pellet showing superconducting $Bi_2Sr_2CaCu_2O_8$ (2212 phase) and $Bi_2Sr_2CuO_6$ formation.

In the same manner as in Example I, 1.423 gm $Pb(NO_3)_2$, 1.957 gm $Bi(NO_3)_3 \cdot 5H_2O$, 9.870 gm $Sr(NO_3)_2$, 5.037 gm $Ca(NO_3)_2 \cdot 4H_2O$ and 4.054 gm $Cu(NO_3)_2 \cdot 6H_2O$ were dissolved in 300 ml DMSO. To this solution 30 ml of water was added. A first PbBiSrCaCuO powder was prepared at −4 V, and a second powder was prepared at −5 V (vs. Ag pseudo reference electrode). Each of the powders was annealed in the range of 840°–880° C. for 5 minutes to 2 hours. FIG. 7 shows the superconducting phase formations of $Bi_2Sr_2CaCu_2O_8$ and $Bi_2Sr_2CuO_6$. The resistive transition shows a zero temperature of 62K.

As is apparent, the present inventive process provides an efficient and effective method for the preparation of superconductor precursor powders. The superconductor precursor powders produced according to this invention can be employed in a wide range of standard applications as known in the art to produce superconductor material. Chief among these applications is powder-in-tube processing. While prior art powder-in-tube processing of crystalline mixed-oxides has not shown good transport properties, it is anticipated that powder-in-tube processing utilizing precursor powders prepared according to the present invention will show a textured core to thereby provide outstanding transport properties.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

I claim:

1. A process for the preparation of a precursor metallic powder composition for use in the subsequent formation of a superconductor, the process comprising the sequential steps of:
   a) providing an electrodeposition bath comprising an electrolyte medium and a cathode substrate electrode;
   b) providing to the bath a plurality of soluble salts of a plurality of respective metals, said metals capable of exhibiting superconductor properties upon subsequent appropriate treatment, wherein salts of Y, Ba and Cu are provided to the bath;
   c) electrically energizing the bath to thereby direct ions of each respective metal in the bath to the substrate electrode to thereby cause formation of metallic and/or reduced particles at the electrode;
   d) continually energizing the bath to cause the particles formed at the electrode to drop as a powder from the electrode into the bath; and e) recovering the powder from the bath.

2. A process as claimed in claim 1 wherein the salts are nitrate salts.

3. A process as claimed in claim 1 wherein a salt of silver is additionally provided to the bath.

4. A process for the preparation of a precursor metallic powder composition for use in the subsequent formation of a superconductor, the process comprising the sequential steps of:

a) providing an electrodeposition bath comprising an electrolyte medium and a cathode substrate electrode;
   b) providing to the bath a plurality of soluble salts of a plurality of respective metals, said metals capable of exhibiting superconductor properties upon subsequent appropriate treatment, wherein salts of Ba, Ca, and Cu are provided to the bath;
   c) electrically energizing the bath to thereby direct ions of each respective metal in the bath to the substrate electrode to thereby cause formation of metallic and/or reduced particles at the electrode;
   d) continually energizing the bath to cause the particles formed at the electrode to drop as a powder from the electrode into the bath; and
   e) recovering the powder from the bath.

5. A process as claimed in claim 4 wherein the salts are nitrate salts.

6. A process as claimed in claim 4 wherein a salt of silver is additionally provided to the bath.

7. A process for the preparation of a precursor metallic powder composition for use in the subsequent formation of a superconductor, the process comprising the sequential steps of:

a) providing an electrodeposition bath comprising an electrolyte medium and a cathode substrate electrode;
   b) providing to the bath a plurality of soluble salts of a plurality of respective metals, said metals capable of exhibiting superconductor properties upon subsequent appropriate treatment, wherein salts of Ba, Ca, Cu, Bi, SR, and Pb are provided to the bath;
   c) electrically energizing the bath to thereby direct ions of each respective metal in the bath to the substrate electrode to thereby cause formation of metallic and/or reduced particles at the electrode;
   d) continually energizing the bath to cause the particles formed at the electrode to drop as a powder from the electrode into the bath; and
   e) recovering the powder from the bath.

8. A process as claimed in claim 7 wherein the salts are nitrate salts.

9. A process as claimed in claim 7 wherein a salt of silver is additionally provided to the bath.

10. A process for the preparation of a precursor metallic powder composition for use in the subsequent formation of a superconductor, the process comprising the sequential steps of:

a) providing an electrodeposition bath comprising an electrolyte medium and a cathode substrate electrode;
    b) providing to the bath a plurality of soluble salts of a plurality of respective metals, said metals capable of exhibiting superconductor properties upon subsequent appropriate treatment, wherein salts of Pb, Bi, Sr, Ca, and Cu are provided to the bath;
    c) electrically energizing the bath to thereby direct ions of each respective metal in the bath to the substrate electrode to thereby cause formation of metallic and/or reduced particles at the electrode;
    d) continually energizing the bath to cause the particles formed at the electrode to drop as a powder from the electrode into the bath; and
    e) recovering the powder from the bath.

11. A process as claimed in claim 10 wherein the salts are nitrate salts.

12. A process as claimed in claim 10 wherein a salt of silver is additionally provided to the bath.

13. A process for the preparation of a precursor metallic powder composition for use in the subsequent formation of a superconductor, the process comprising the sequential steps of:

a) providing an electrodeposition bath comprising an electrolyte medium and a cathode substrate electrode;
    b) providing to the bath a plurality of soluble salts of a plurality of respective metals, said metals capable of exhibiting superconductor properties upon subsequent appropriate treatment, wherein salts of Bi, Sr, Ca, and Cu are provided to the bath;
    c) electrically energizing the bath to thereby direct ions of each respective metal in the bath to the substrate electrode to thereby cause formation of metallic and/or reduced particles at the electrode;
    d) continually energizing the bath to cause the particles formed at the electrode to drop as a powder from the electrode into the bath; and
    e) recovering the powder from the bath.

14. A process as claimed in claim 13 wherein the salts are nitrate salts.

15. A process as claimed in claim 13 wherein a salt of silver is additionally provided to the bath.

16. A process for the preparation of a precursor metallic powder composition for use in the subsequent formation of a superconductor, the process comprising the sequential steps of:

a) providing an electrodeposition bath comprising an electrolyte medium and a cathode substrate electrode;
    b) providing to the bath a plurality of soluble salts of a plurality of respective metals, said metals capable of exhibiting superconductor properties upon subsequent appropriate treatment, wherein salts of Tl, Bi, Sr, Ba, Ca, and Cu are provided to the bath;
    c) electrically energizing the bath to thereby direct ions of each respective metal in the bath to the substrate electrode to thereby cause formation of metallic and/or reduced particles at the electrode;
    d) continually energizing the bath to cause the particles formed at the electrode to drop as a powder from the electrode into the bath; and
    e) recovering the powder from the bath.

17. A process as claimed in claim 16 wherein the salts are nitrate salts.

18. A process as claimed in claim 16 wherein a salt of silver is additionally provided to the bath.

19. A process for the preparation of a high temperature superconductor pellet product, the process comprising the sequential steps of:

a) providing an electrodeposition bath comprising an electrolyte medium and a cathode substrate electrode;
    b) providing to the bath a plurality of soluble salts of a plurality of respective metals, said metals capable of exhibiting superconductor properties upon subsequent appropriate treatment, wherein salts of Y, Ba and Cu are provided to the bath;
    c) electrically energizing the bath to thereby direct ions of each respective metal in the bath to the substrate electrode to thereby cause formation of metallic particles at the electrode;

d) continually energizing the bath to cause the particles formed at the electrode to drop as a powder from the electrode into the bath;

e) recovering the powder from the bath;

f) cleaning and drying the recovered powder; and g) forming the powder into a pellet and oxidizing the pellet in flowing oxygen in ambient conditions sufficient to cause formation of a superconductor.

20. A process for the preparation of a high temperature superconductor pellet product, the process comprising the sequential steps of:

a) providing an electrodeposition bath comprising an electrolyte medium and a cathode substrate electrode;

b) providing to the bath a plurality of soluble salts of a plurality of respective metals, said metals capable of exhibiting superconductor properties upon subsequent appropriate treatment, wherein salts of Pb, Bi, Sr, Ca, and Cu are provided to the bath;

c) electrically energizing the bath to thereby direct ions of each respective metal in the bath to the substrate electrode to thereby cause formation of metallic particles at the electrode;

d) continually energizing the bath to cause the particles formed at the electrode to drop as a powder from the electrode into the bath;

e) recovering the powder from the bath;

f) cleaning and drying the recovered powder; and g) forming the powder into a pellet and oxidizing the pellet in flowing oxygen in ambient conditions sufficient to cause formation of a superconductor.

21. A process for the preparation of a high temperature superconductor pellet product, the process comprising the sequential steps of:

a) providing an electrodeposition bath comprising an electrolyte medium and a cathode substrate electrode;

b) providing to the bath a plurality of soluble salts of a plurality of respective metals, said metals capable of exhibiting superconductor properties upon subsequent appropriate treatment, wherein salts of Tl, Bi, Sr, Ba, Ca, and Cu are provided to the bath;

c) electrically energizing the bath to thereby direct ions of each respective metal in the bath to the substrate electrode to thereby cause formation of metallic particles at the electrode;

d) continually energizing the bath to cause the particles formed at the electrode to drop as a powder from the electrode into the bath;

e) recovering the powder from the bath;

f) cleaning and drying the recovered powder; and g) forming the powder into a pellet and oxidizing the pellet in flowing oxygen in ambient conditions sufficient to cause formation of a superconductor.

22. A process as claimed in claim 21 wherein a salt of silver is additionally provided to the bath.

* * * * *